(12) United States Patent
Kim (10) Patent No.: US 9,278,302 B2
(45) Date of Patent: Mar. 8, 2016

(54) FILTER FOR DUST COLLECTOR

(71) Applicant: EPiT Co., Ltd., Incheon (KR)

(72) Inventor: Jong Moon Kim, Incheon (KR)

(73) Assignee: EPIT CO., LTD., Incheon (KR)

( * ) Notice: Subject to any disclaimer, the term of this patent is extended or adjusted under 35 U.S.C. 154(b) by 200 days.

(21) Appl. No.: 14/071,358

(22) Filed: Nov. 4, 2013

(65) Prior Publication Data

US 2014/0144114 A1    May 29, 2014

(30) Foreign Application Priority Data

Nov. 26, 2012 (KR) .......................... 10-2012-0134498

(51) Int. Cl.
*B01D 46/00* (2006.01)
*B01D 46/52* (2006.01)

(52) U.S. Cl.
CPC .................................. *B01D 46/521* (2013.01)

(58) Field of Classification Search
CPC ...... B01D 46/10; B01D 46/24; B01D 46/521; B01D 46/523
USPC ................. 55/486, 491–492, 499, 522; 96/15
See application file for complete search history.

(56) References Cited

U.S. PATENT DOCUMENTS 2,918,138 A * 12/1959 Lewis ............................ 55/486
2,925,456 A *  2/1960 Beusker et al. ............... 429/145
2013/0298773 A1 * 11/2013 Yamagishi et al. ............ 96/15

FOREIGN PATENT DOCUMENTS

KR    20-2010-0007485 U    7/2010

* cited by examiner

*Primary Examiner* — Robert Clemente
*Assistant Examiner* — Karla Hawkins (57) ABSTRACT

A filter includes a filter cloth having a corrugated form, a retainer disposed inside the filter cloth, a support groove formed at each corrugated inside bent portion abutting on the retainer in a longitudinal direction of a filter film, and a reinforcement member inserted into the support groove.

19 Claims, 12 Drawing Sheets

FILTER FOR DUST COLLECTOR

RELATED APPLICATIONS(S)

This application claims the benefit of Korean Patent Application No. 10-2012-0134498, filed on Nov. 26, 2012, which is hereby incorporated by references as if fully set forth herein.

FIELD OF THE INVENTION

The present invention relates to a filter for a dust collector, and more particularly, to a filter for a dust collector suitable to maintain rigidity of a filter cloth while efficiently filtering out all sorts of dust particles contained in gas.

BACKGROUND OF THE INVENTION

In general, a filter cloth is configured as a foldable corrugated filter in order to increase dust collection efficiency in a dust collector, and it may be possible to obtain relatively high dust collection efficiency by increasing a surface area of the foldable corrugated filter through a structure thereof.

Meanwhile, when a filter medium, having low rigidity, such as a needle-punched nonwoven fabric and a woven fabric is used as the filter cloth, the filter medium per se may not be held in a corrugated form because of a material thereof having low strength.

Accordingly, in order to hold the filter medium in a corrugated form in the related art, a method is mainly used in which the filter medium is heated and corrugation-formed in a state of containing thermosetting resin such that the corrugated form is fixed to the filter medium. However, there is a problem in that the contained thermosetting resin reduces filterability of the filter for a dust collector.

Meanwhile, a method is already proposed in which opposed portions of the filter cloth are sewn and bonded along a longitudinal direction of the filter cloth in the vicinity of folded portions (a peak portion and a valley portion) in the corrugated form in order to hold the filter cloth in the corrugated form (see Patent Document 1: Korean Unexamined Utility Model Application Publication No. 2010-0007485, published on Jul. 22, 2010).

However, when the conventional filter cloth held in the corrugated form by sewing is used as the filter cloth (back filter) for the dust collector, the filter cloth has a problem in durability.

That is, in the dust collector, the filter cloth is provided, at an inner side thereof, with a retainer in order to be held in a cylindrical shape, and the filter cloth is cleaned by regularly repeated spraying from the inner side thereof using a vibro-method including a pulse jet method, an air blowing method, or a dust removal method.

Accordingly, in a structure of securing the corrugated form of the filter cloth by sewing, the folded portion (inside bent portion in the corrugated form) at the inner side of the filter cloth coming into contact with the retainer is tend to sag as a dust removal process such as pulse jet spraying is repeatedly performed, since the corrugated portion has weaker rigidity compared with a resin processed product. In addition, the corrugated form of the filter cloth may vanish by repeated cleaning to thereby decrease filter efficiency or the filter cloth may be early damaged due to contact with the retainer.

In addition, since the folded portion (peak portion in the corrugated form) at the outer side of the filter cloth does not come into direct contact with the retainer, the filter cloth is not rapidly damaged at the outer side thereof compared with the inner side thereof coming into contact with the retainer. However, the outer side of the filter cloth may be deformed due to blow-bye of strands of thread by the pulse jet and repeated bending, or even damaged due to fatigue.

SUMMARY OF THE INVENTION

In accordance with an aspect of the exemplary embodiment of the present invention, there is provided a filter for a dust collector, which includes a filter cloth having a corrugated form, a retainer disposed inside the filter cloth, a support groove formed at each corrugated inside bent portion abutting on the retainer in a longitudinal direction of a filter film, and a reinforcement member inserted into the support groove.

In the exemplary embodiment, the support groove may be formed via a sewing process.

In the exemplary embodiment, the reinforcement member may be fixedly attached within the support groove.

In the exemplary embodiment, the reinforcement member may be provided in the form of a strap or a tape having at least larger strength than that of the basic material of the filter cloth.

In the exemplary embodiment, the reinforcement member may be fixed to the support groove through a sewing line defined therein by sewing.

In the exemplary embodiment, the reinforcement member may be made of a material equal to the basic material of the filter cloth.

In the exemplary embodiment, further may include reinforced cloths which are sewn and attached to outer sides of the inside bent portions.

In the exemplary embodiment, the reinforced cloths may be sewn and attached to the inside bent portions along the longitudinal direction thereof in a line alternate manner of skipping over one or more inside bent portions adjacent to each other.

In the exemplary embodiment, the reinforced cloths may be configured as a plurality of reinforcement pieces which are sewn and attached to the outer sides of the inside bent portions so as to be spaced apart from each other at regular intervals along the longitudinal direction thereof.

In the exemplary embodiment, further may include outside bent portions, each of which is formed outside the filter cloth at a side opposite to the retainer and is defined by a sewing line.

In accordance with another of the exemplary embodiment of the present invention, there is provided a filter for a dust collector, which includes a filter cloth having a corrugated form, a retainer disposed inside the filter cloth, an inside support groove formed at each corrugated inside bent portion abutting on the retainer in a longitudinal direction of a filter film, an inside reinforcement member inserted into the inside support groove, an outside support groove formed at each corrugated outside bent portion in the longitudinal direction of the filter film, and an outside reinforcement member inserted into the outside support groove.

In the exemplary embodiment, each of the inside and outside support grooves may be formed via a sewing process.

In the exemplary embodiment, the inside and outside reinforcement members may be fixedly attached within the inside and outside support grooves, respectively.

In the exemplary embodiment, each of the inside and outside reinforcement members may be provided in the form of a strap or a tape having at least larger strength than that of the basic material of the filter cloth.

In the exemplary embodiment, the inside and outside reinforcement members may be fixed to the inside and outside support grooves through sewing lines defined therein by sewing, respectively.

In the exemplary embodiment, each of the inside and outside reinforcement members may be made of a material equal to the basic material of the filter cloth.

In the exemplary embodiment, further may include reinforced cloths which are sewn and attached to outer sides of the inside bent portions.

In the exemplary embodiment, the reinforced cloths may be sewn and attached to the inside bent portions along the longitudinal direction thereof in a line alternate manner of skipping over one or more inside bent portions adjacent to each other.

In the exemplary embodiment, the reinforced cloths may be configured as a plurality of reinforcement pieces which are sewn and attached to the outer sides of the inside bent portions so as to be spaced apart from each other at regular intervals along the longitudinal direction thereof.

BRIEF DESCRIPTION OF THE DRAWINGS

The objects and features of the present invention will become apparent from the following description of embodiments given in conjunction with the accompanying drawings, in which.

DETAILED DESCRIPTION OF THE EMBODIMENTS

Hereinafter, embodiments of the present invention will be described in detail with reference to the accompanying drawings which form a part hereof.

Figure 1:
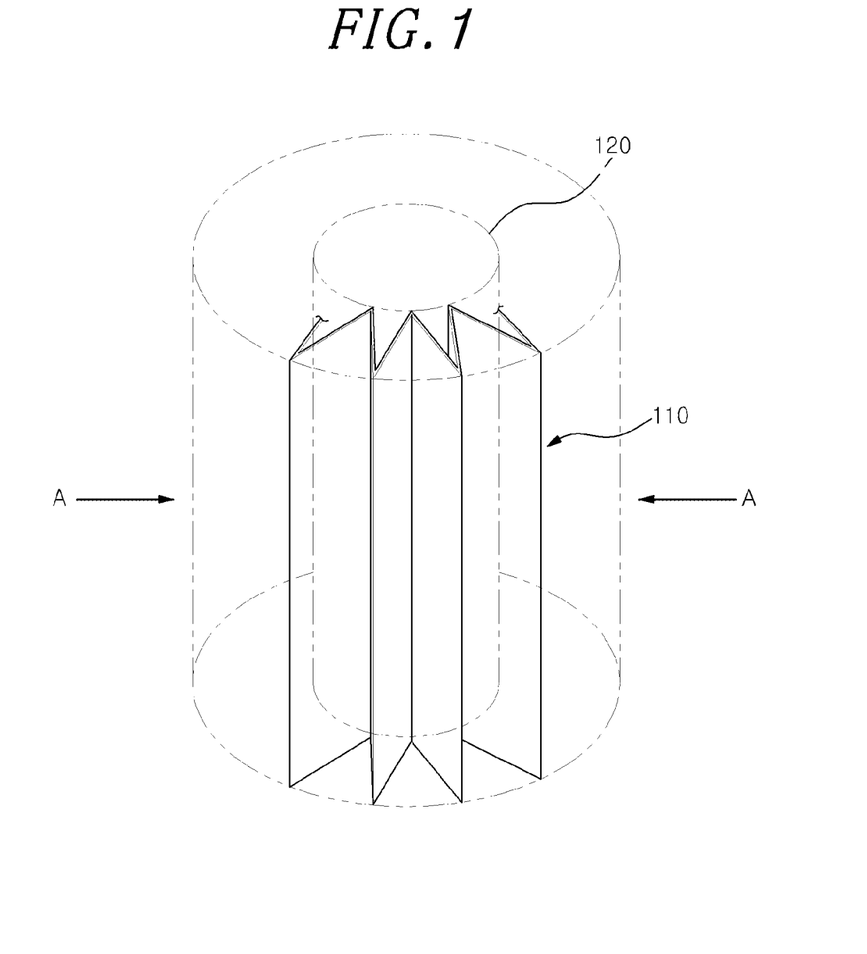
FIG. 1 is a perspective view schematically illustrating a filter for a dust collector in which a cylindrical filter cloth is schematically shown.

FIG. 1 is a perspective view schematically illustrating a filter for a dust collector in which a cylindrical filter cloth is schematically shown.

As shown in FIG. 1, the filter for a dust collector according to the present invention has a structure in which a filter cloth 110 having a corrugated form is provided in a cylindrical shape and a retainer 120 is inserted inside the filter cloth 110 such that the filter cloth 110 may be held in the cylindrical shape. The corrugated form of the filter cloth 110 may be formed using a corrugation machine or the like known in the art. In this case, the filter cloth 110 and the retainer 120 are not necessarily formed as a cylindrical shape, and may be modified in shape as needed or use.

Herein, the filter cloth 110, for example, as a needle-punched nonwoven fabric may be fabricated by sewing a single fiber (staple) of an organic synthetic fiber (short fiber or a long fiber) such as polyester, nylon, P84, aramid, or PTFE (polytetrafluoroethylene) on a foundation cloth as a woven fabric woven from lines of thread of an organic synthetic fiber (short fiber or a long fiber) such as polyester, nylon, P84, aramid, or PTFE (polytetrafluoroethylene) or of an inorganic fiber such as a glass fiber by means of needle punching.

In addition, the filter cloth 110 may be fabricated by a woven fabric alone having good dust collection efficiency instead of a nonwoven fabric, or may also be configured to contain an inorganic fiber such as ceramic instead of an organic synthetic fiber.

Figure 2:
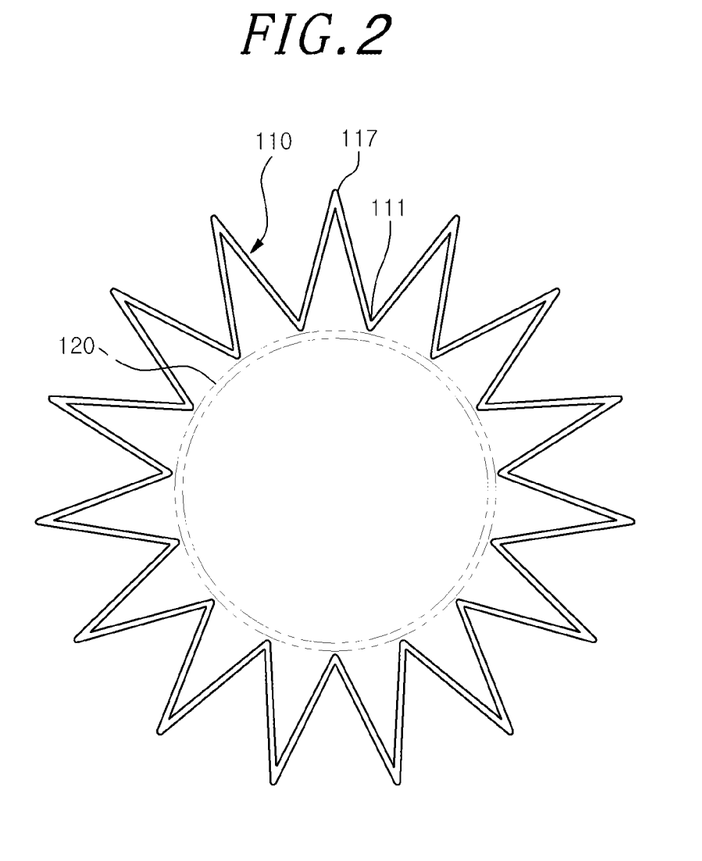
FIG. 2 is a cross-sectional view taken along line A-A in FIG. 1.

FIG. 2 is a cross-sectional view taken along line A-A in FIG. 1. The filter for a dust collector according to the present invention has a structure in which the filter cloth 110 configured as the corrugated form by a plurality of filter films is formed with inside bent portions 111 abutting on the retainer 120 and is formed with outside bent portions 117 at opposed sides of the inside bent portions 111.

Herein, the inside bent portions 111 and the outside bent portions 117 may be defined as inside folded portions and outside folded portions. Each of the inside and outside bent portions 111 and 117 may be defined by a sewing line (not shown) formed via a sewing process.

Figure 3:
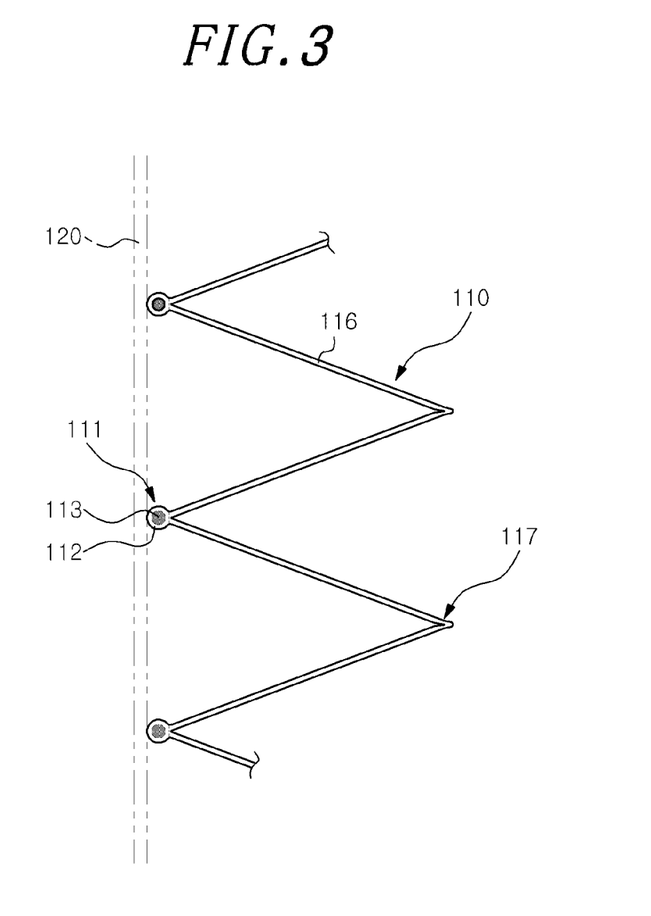
FIG. 3 is a longitudinal sectional view schematically illustrating a portion of a filter cloth structure in an unfolded form in accordance with an embodiment of the present invention.

FIG. 3 is a longitudinal sectional view schematically illustrating a portion of a filter cloth structure in an unfolded form of in accordance with an embodiment of the present invention.

Referring to FIG. 3, the inside bent portion 111 of the filter cloth 110 which abuts on the retainer 120 disposed (inserted) inside the filter cloth 110 includes a cylindrical support groove 112 formed in a longitudinal direction of the filter film 116 and a reinforcement member 113 fixedly attached (inserted) within the support groove 112. In this case, the support groove 112 is not necessarily formed as a cylindrical shape, and may have a variety of shapes depending upon the shape of the reinforcement member 113.

Herein, the reinforcement member 113 may be fixedly attached within the support groove 112 by performing a sewing process, for example, in a state in which the reinforcement member 113 is located at an inner side of the inside bent portion 111 (at an opposed side of the retainer 120). That is, the support groove 112 into which the reinforcement member 113 is fixedly inserted is defined by sewing line formed via the sewing process.

The reinforcement member 113 fixedly attached to the support groove 112 may be provided in a strap form or a tape form having at least larger or smaller strength than or strength equal to that of the basic material of the filter cloth 110. The reinforcement member 113 may be fabricated of a material equal to the basic material of the filter cloth 110.

Accordingly, in the filter for a dust collector of the present embodiment, the corrugated form of the filter cloth may be held with high strength for a long time by forming the reinforcement member 113 fixedly attached to the support groove 112 at the inside bent portion 111 of the filter cloth 110. In addition, the inside bent portion 111 may be efficiently prevented from being early damaged due to frequent contact with the retainer 120 inserted inside the filter cloth during dust removal by attaching the reinforcement member 113 elongated in the longitudinal direction of the filter film to the inside bent portion 111 of the filter cloth 110.

Meanwhile, although not shown in detail in FIG. 3, the filter for a dust collector of the present embodiment may further include the outside bent portion 117 of the filter cloth 110 defined by the sewing line formed via the sewing process at the opposed side of the inside bent portion 111 (at an outer side opposite to the retainer 120). This enables the corrugated form of the filter cloth 110 to have additionally reinforced rigidity.

Figure 4:
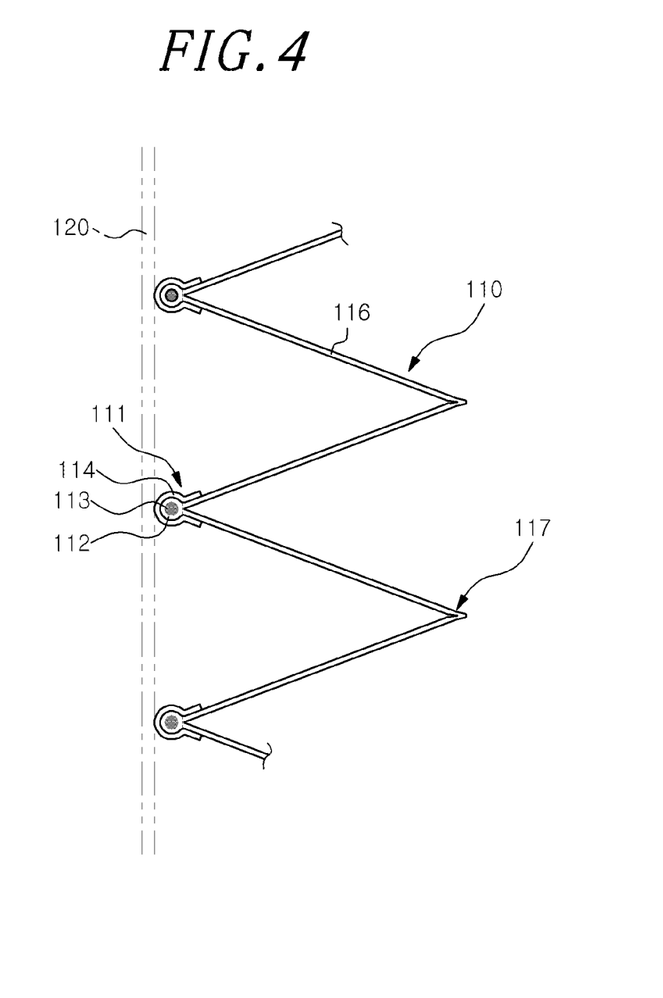
FIG. 4 is a longitudinal sectional view schematically illustrating a portion of a filter cloth structure in an unfolded form in accordance with a modified example of the embodiment of the present invention.

FIG. 4 is a longitudinal sectional view schematically illustrating a portion of a filter cloth structure in an unfolded form in accordance with a modified example of the embodiment of the present invention.

Referring to FIG. 4, the filter for a dust collector according to the present modified example may further include a reinforced cloth 114 attached to an outer portion (outer side) of each inside bent portion 111 of the filter cloth 110 by the sewing process. Herein, the reinforced cloth 114 formed outside each inside bent portion 111 may be configured as a small cloth made of the same material as or a fiber equal or similar to the filter cloth 110.

The reinforced cloth 114 may be attached together with the reinforcement member 113 by performing a single sewing process or may also be attached via a separate sewing process after first attaching the reinforcement member 113, for example, in a state in which the reinforcement member 113 is located at the inner side of the inside bent portion 111 and the reinforced cloth 114 is located at the outer side (outer portion) of the inside bent portion 111. Herein, the reinforced cloth 114 may be formed of a woven cloth when the filter cloth 110 is a nonwoven cloth, and both of the filter cloth 110 and the reinforced cloth 114 may also be formed of woven cloth of the same material.

Figure 5:
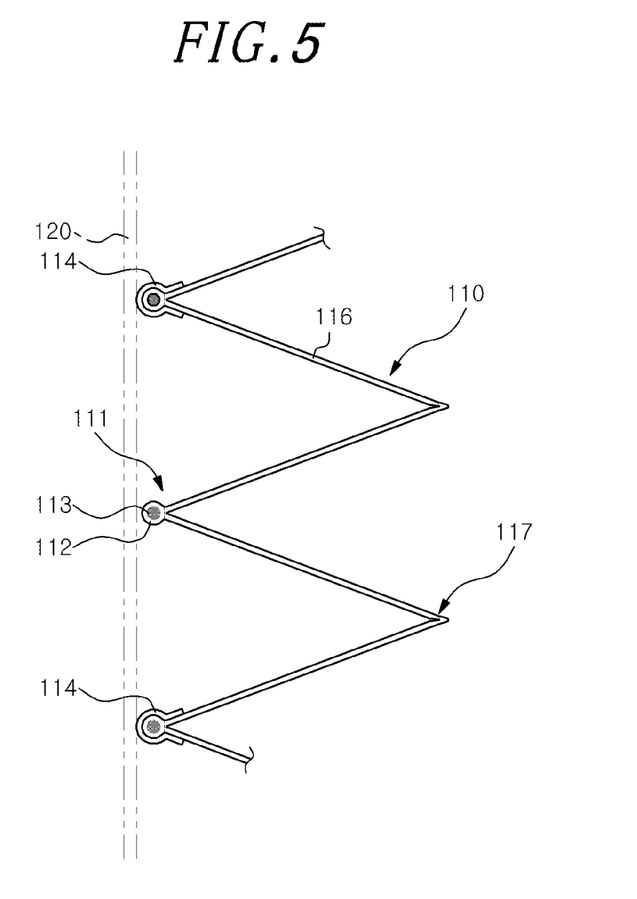
FIG. 5 is a longitudinal sectional view schematically illustrating a portion of a filter cloth structure in an unfolded form in accordance with another modified example of the embodiment of the present invention.

FIG. 5 is a longitudinal sectional view schematically illustrating a portion of a filter cloth structure in an unfolded form in accordance with another modified example of the embodiment of the present invention.

Referring to FIG. 5, in the filter for a dust collector according to the present modified example, reinforced cloths 114 are sewn and attached to the associated inside bent portions along the longitudinal direction thereof in a line alternate manner of skipping over one or more inside bent portions adjacent to each other, unlike the filter for a dust collector of FIG. 4 in which the respective reinforced cloths 114 are all attached (formed) to the outer sides of the respective inside bent portions 111. For the better understanding of the description, FIG. 5 exemplarily shows a case the reinforced cloths 114 are attached in a manner of skipping over one line.

For example, in the filter for a dust collector according to the present modified example, the reinforced cloths 114 may be sewn and attached in a line alternate manner of skipping over the inside bent portions by one line, two lines, or three lines. The number of skipped lines may be determined by considering the use or use environment of the filter for a dust collector, the material or consumption of the reinforced cloth, or the like.

Figure 6:
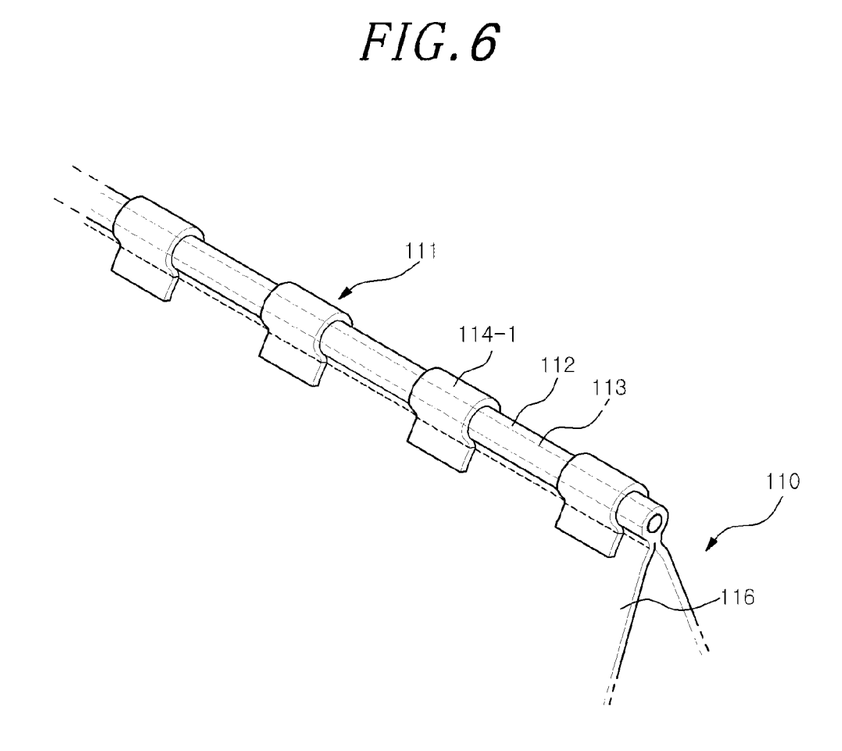
FIG. 6 is a side sectional view schematically illustrating a portion of a filter cloth structure in an unfolded form in accordance with a yet modified example of the embodiment of the present invention.

FIG. 6 is a side sectional view schematically illustrating a portion of a filter cloth structure in an unfolded form in accordance with a yet modified example of the embodiment of the present invention.

Referring to FIG. 6, in the filter for a dust collector according to the present modified example, the reinforced cloths may be configured as a plurality of reinforcement pieces 114-1 which are sewn and attached to the outer sides of the inside bent portions 111 so as to be spaced apart from each other at regular intervals along the longitudinal direction thereof, unlike the filter for a dust collector of FIG. 4 in which each of the reinforced cloths 114 is attached (formed) with respect to the entirety of the associated inside bent portion 111 in the longitudinal direction thereof.

Herein, similarly to the modified example of FIG. 4, each reinforcement piece 114-1 may be attached together with the reinforcement member 113 by performing a single sewing process or may also be attached via a separate sewing process after first attaching the reinforcement member 113, in a state in which the reinforcement member 113 is located at the inner side of the inside bent portion 111 and the reinforcement piece 114-1 is located at the outer side (outer portion) of the inside bent portion 111.

Figure 7:
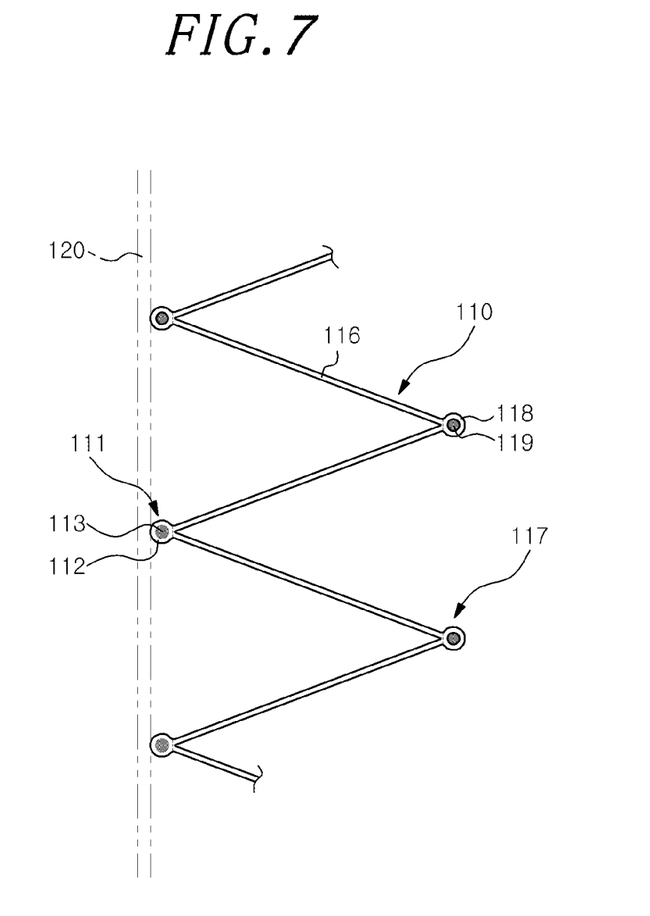
FIG. 7 is a longitudinal sectional view schematically illustrating a portion of a filter cloth structure in an unfolded form of in accordance with another embodiment of the present invention.

FIG. 7 is a longitudinal sectional view schematically illustrating a portion of a filter cloth structure in an unfolded form of in accordance with another embodiment of the present invention.

Referring to FIG. 7, the filter for a dust collector may include a filter cloth 110 having a corrugated form, a retainer 120 disposed inside the filter cloth 110, an inside support groove 112 which is formed at each corrugated inside bent portion 111 abutting on the retainer 120 in a longitudinal direction of each filter film 116, an inside reinforcement member 113 inserted within the inside support groove 112, an outside support groove 118 which is formed at each corrugated outside bent portion 117 in the longitudinal direction of the filter film 116, and an outside reinforcement member 119 inserted within the outside support groove 118.

That is, the filter for a dust collector according to the present embodiment differs from the filter for a dust collector shown in FIG. 3 in terms of further forming the outside reinforcement member 119 fixedly attached by the outside support groove 118, and other structures, functions, and materials of all components are substantially similar to the corresponding components shown in FIG. 3. Accordingly, no detailed description in FIG. 7 will be given in order to avoid an unnecessary overlapping description for brevity.

Therefore, since the filter for a dust collector according to the present embodiment is formed with the reinforcement members at the respective inside and outside bent portions of the filter cloth, the corrugated form of the filter film may be held with increased rigidity, compared with the above-mentioned filter for a dust collector shown in FIG. 3.

Figure 8:
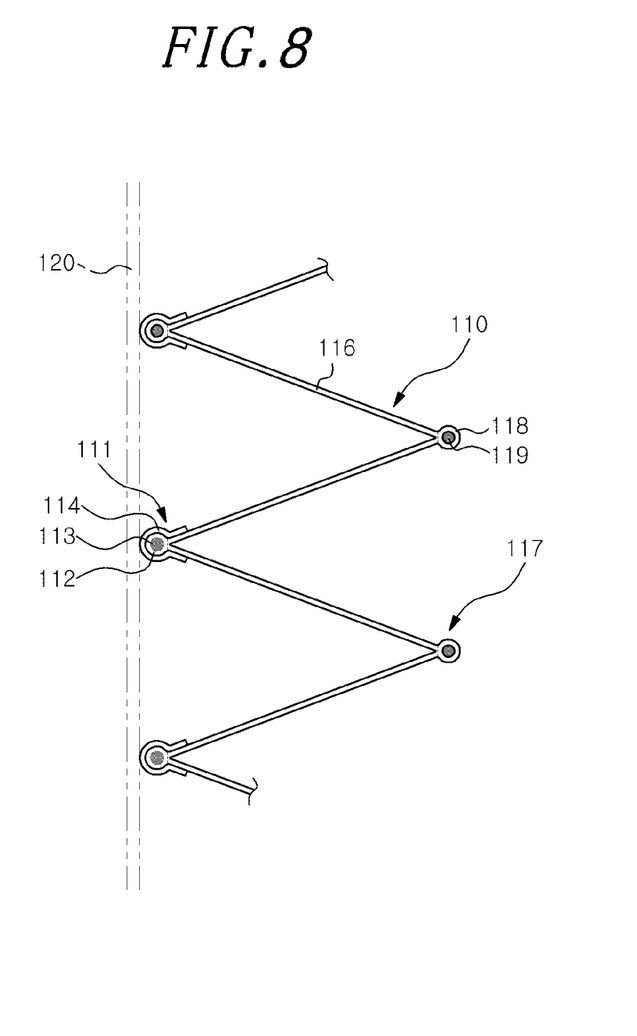
FIG. 8 is a longitudinal sectional view schematically illustrating a portion of a filter cloth structure in an unfolded form in accordance with a modified example of another embodiment of the present invention.

FIG. 8 is a longitudinal sectional view schematically illustrating a portion of a filter cloth structure in an unfolded form in accordance with a modified example of another embodiment of the present invention.

Referring to FIG. 8, the filter for a dust collector according to the present modified example may further include a reinforced cloth 114 attached to an outer portion (outer side) of each inside bent portion 111 of the filter cloth 110 by the sewing process, similarly to the modified example shown in FIG. 4. Herein, the reinforced cloth 114 formed outside each inside bent portion 111 may be configured as a small cloth made of the same material as or a fiber equal or similar to the filter cloth 110.

Similarly to the modified example shown in FIG. 4, the reinforced cloth 114 of the present modified example may be attached together with the reinforcement member 113 by performing a single sewing process or may also be attached via a separate sewing process after first attaching the reinforcement member 113, in a state in which the reinforcement member 113 is located at the inner side of the inside bent portion 111 and the reinforced cloth 114 is located at the outer side (outer portion) of the inside bent portion 111.

Figure 9:
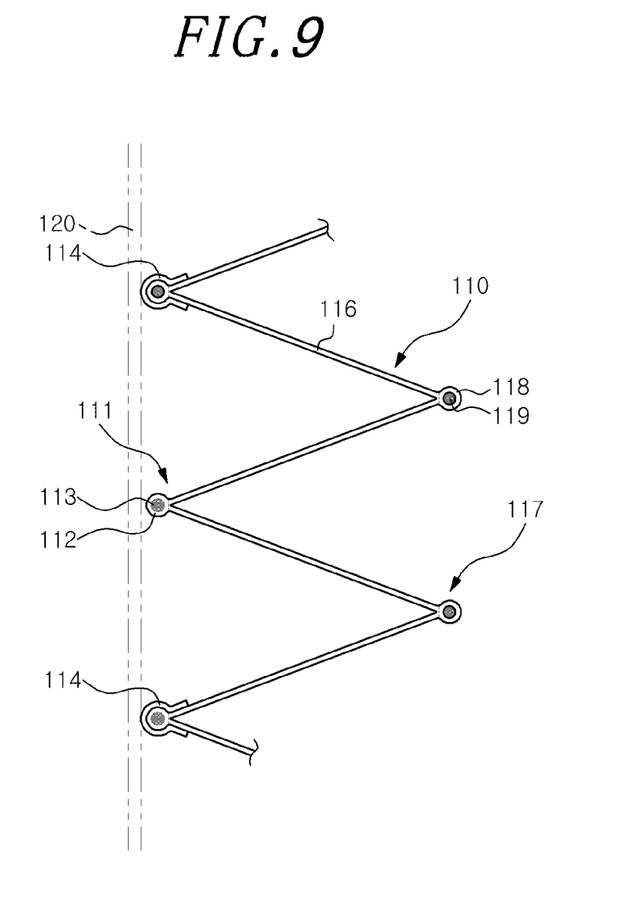
FIG. 9 is a longitudinal sectional view schematically illustrating a portion of a filter cloth structure in an unfolded form in accordance with another modified example of another embodiment of the present invention.

FIG. 9 is a longitudinal sectional view schematically illustrating a portion of a filter cloth structure in an unfolded form in accordance with another modified example of another embodiment of the present invention.

Referring to FIG. 9, in the filter for a dust collector according to the present modified example, reinforced cloths 114 are sewn and attached to the associated inside bent portions along the longitudinal direction thereof in a line alternate manner of skipping over one or more inside bent portions adjacent to each other, similarly to the modified example shown in FIG. 5.

For example, in the filter for a dust collector according to the present modified example, the reinforced cloths 114 may be sewn and attached in a line alternate manner of skipping over the inside bent portions by one line, two lines, or three lines. The number of skipped lines may be determined by considering the use or use environment of the filter for a dust collector, the material or consumption of the reinforced cloth, or the like.

Figure 10:
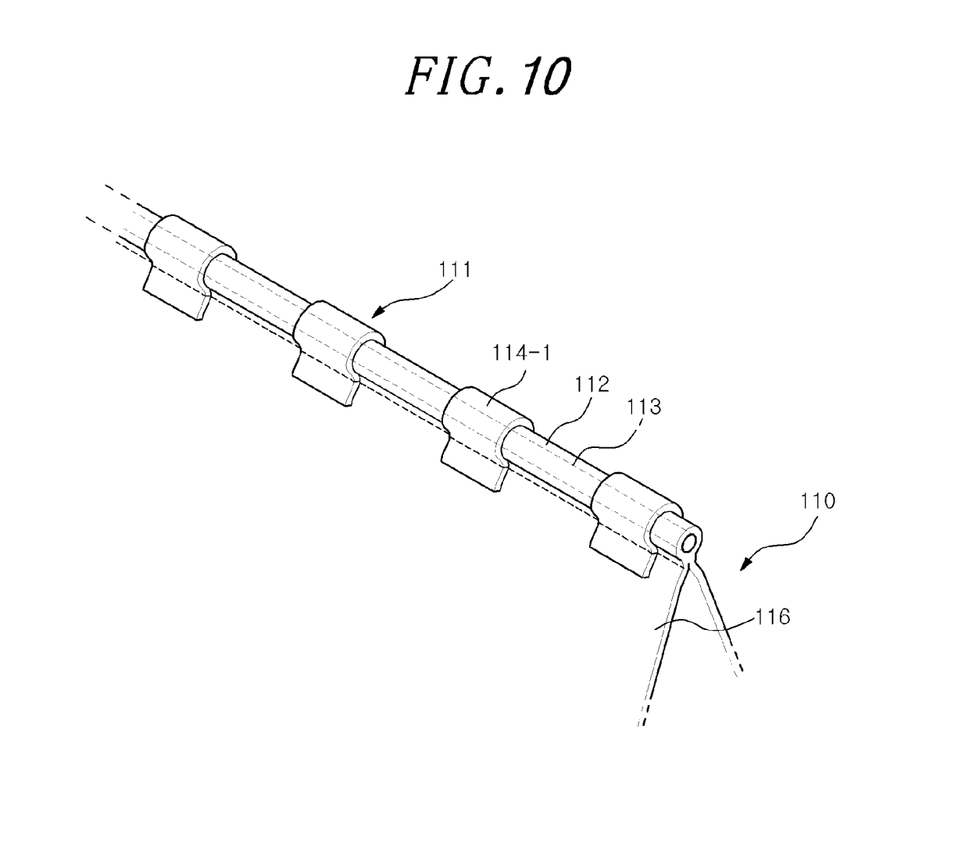
FIG. 10 is a side sectional view schematically illustrating a portion of a filter cloth structure in an unfolded form in accordance with a yet modified example of another embodiment of the present invention.

FIG. 10 is a side sectional view schematically illustrating a portion of a filter cloth structure in an unfolded form in accordance with a yet modified example of another embodiment of the present invention.

Referring to FIG. 10, in the filter for a dust collector according to the present modified example, the reinforced cloths may be configured as a plurality of reinforcement pieces 114-1 which are sewn and attached to the outer sides of the inside bent portions 111 so as to be spaced apart from each other at regular intervals along the longitudinal direction thereof, similarly to the modified example shown in FIG. 6.

Herein, similarly to the modified example of FIG. 6, each reinforcement piece 114-1 may be attached together with the reinforcement member 113 by performing a single sewing process or may also be attached via a separate sewing process after first attaching the reinforcement member 113, in a state in which the reinforcement member 113 is located at the inner side of the inside bent portion 111 and the reinforcement piece 114-1 is located at the outer side (outer portion) of the inside bent portion 111.

Meanwhile, although the embodiments of the present invention have described an example in which the reinforcement member fixedly inserted into the support groove defined by the sewing line is formed in a substantially circular shape, this is presented by way of an illustrative example only and the present invention is not limited thereto. For example, a strap form or a tape form may also be applied as a structure of the reinforcement member.

Figure 11:
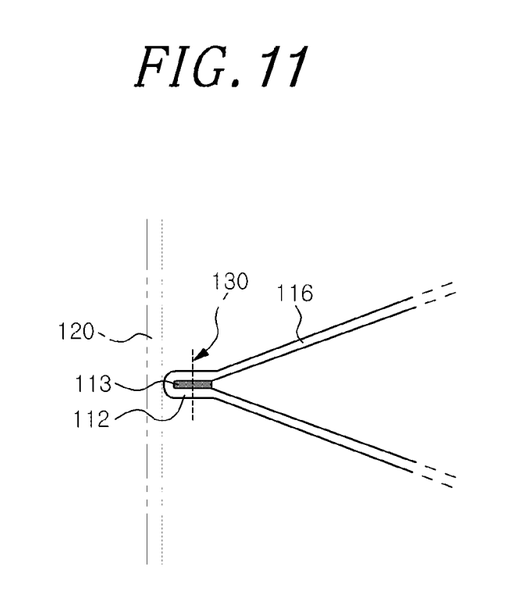
FIG. 11 is a cutaway longitudinal sectional view illustrating a portion of a filter cloth structure to which a reinforcement member is applied in the form of a strap or a tape in accordance with a yet embodiment of the present invention.

FIG. 11 is a cutaway longitudinal sectional view illustrating a portion of a filter cloth structure to which a reinforcement member is applied in the form of a strap or a tape in accordance with a yet embodiment of the present invention.

Referring to FIG. 11, the filter for a dust collector according to the present embodiment differs from the above-mentioned embodiments in that the structure (or form) of the reinforcement member 113 is provided in the form of a strap or a tape instead of a circular form. That is, the reinforcement member 113 is provided in the strap form or the tape form having at least larger or smaller strength than or strength equal to that of the basic material of the filter cloth.

Herein, the reinforcement member 113 of the strap form or the tape form may be fabricated of a material capable of being sewn by a sewing process.

That is, as shown in FIG. 11, the filter for a dust collector according to the present embodiment may have a structure in which a sewing line 130 is defined at a particular position (for example, at a substantially central portion) of the reinforcement member 113 inserted into the support groove 112 formed at the inside bent portion in the longitudinal direction of the filter film.

Accordingly, since the filter for a dust collector according to the present embodiment has a structure in which the reinforcement member 113 is fixed to the support groove 112 through the sewing line 130 defined therein (formed across an inner portion thereof) by sewing (thread), the reinforcement member 113 may be more securely fixed to the support groove 112, compared with the above-mentioned embodiments.

Figure 12:
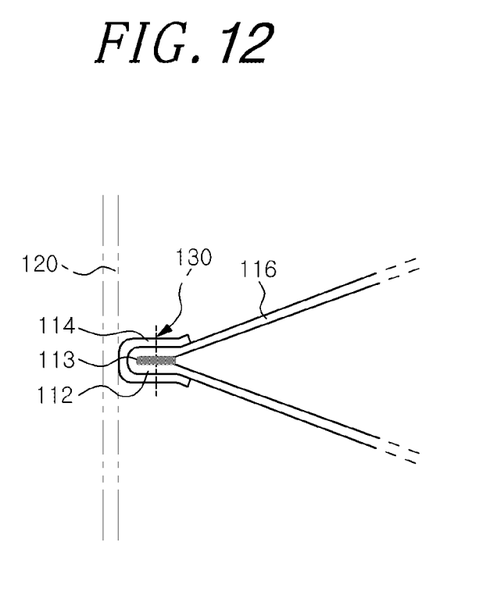
FIG. 12 is a cutaway longitudinal sectional view illustrating a portion of a filter cloth structure to which a reinforcement member is applied in the form of a strap or a tape in accordance with a modified example of the yet embodiment of the present invention.

FIG. 12 is a cutaway longitudinal sectional view illustrating a portion of a filter cloth structure to which a reinforcement member is applied in the form of a strap or a tape in accordance with a modified example of the yet embodiment of the present invention.

Referring to FIG. 12, the filter for a dust collector according to the present embodiment may further include a reinforced cloth 114 which is sewn and attached to the outer side of the inside bent portion together with the reinforcement member 113, similarly to the above-mentioned embodiments.

Herein, the reinforced cloth 114 may be fixed to the support groove 112, together with the reinforcement member 113, through a sewing line 130 defined therein (formed across an inner portion thereof) by sewing (thread).

Meanwhile, similarly to the above-mentioned embodiments, in the filter for a dust collector according to the present embodiment, the reinforced cloths may be sewn and attached to the associated inside bent portions along the longitudinal direction thereof in a line alternate manner of skipping over one or more inside bent portions adjacent to each other, the reinforced cloths may be configured as a plurality of reinforcement pieces which are sewn and attached to the outer sides of the inside bent portions so as to be spaced apart from each other at regular intervals along the longitudinal direction thereof, or an outside bent portion defined by a sewing line may be further formed outside the filter cloth at a side opposite to the retainer.

Furthermore, similarly to the above-mentioned embodiments, the filter for a dust collector according to the present embodiment may also include an inside support groove, an inside reinforcement member which is inserted and fixed into the inside support groove by sewing, an outside support groove, and an outside reinforcement member which is inserted and fixed into the outside support groove by sewing.

In accordance with the embodiments of the present invention, the corrugated form of the filter for a dust collector may be held with high strength for a long time by adopting the reinforcement member elongated at the bent portion (folded portion) in the longitudinal direction of the filter film.

In addition, in accordance with the embodiments of the present invention, the filter for a dust collector may suppress the early damage of the inside bent portion coming into contact with the retainer at the inner side of the filter during dust removal by way of the reinforcement member elongated at the bent portion (folded portion) in the longitudinal direction of the filter film, thereby enabling the span of the filter for a dust collector to be further lengthened.

While the invention has been shown and described with respect to the preferred embodiments, the present invention is not limited thereto. It will be understood by those skilled in the art that various changes and modifications may be made without departing from the scope of the invention as defined in the following claims.

What is claimed is:

1. A filter for a dust collector comprising:
    a filter cloth having a corrugated form in which a plurality of outside bent portions and inside bent portions are provided;
    a retainer disposed inside the filter cloth;
    a support groove formed at each of the corrugated inside bent portions abutting the retainer, in a longitudinal direction of the filter cloth;
    a reinforcement member inserted into the support groove; and
    reinforced cloths disposed on outer surfaces of the filter cloth between the filter cloth and the retainer, the reinforced cloths surrounding respective inside bent portions without reaching the respective outside bent portions.

2. The filter for a dust collector of claim 1, wherein the support groove is formed via a sewing process.

3. The filter for a dust collector of claim 1, wherein the reinforcement member is fixedly attached within the support groove.

4. The filter for a dust collector of claim 3, wherein the reinforcement member is provided in the form of a strap or a tape having at least larger strength than that of the basic material of the filter cloth.

5. The filter for a dust collector of claim 4, wherein the reinforcement member is fixed to the support groove through a sewing line defined therein by sewing.

6. The filter for a dust collector of claim 1, wherein the reinforcement member is made of a material equal to the basic material of the filter cloth.

7. The filter for a dust collector of claim 1, wherein the reinforced cloths are sewn and attached to outer sides of the inside bent portions.

8. The filter for a dust collector of claim 7, wherein the reinforced cloths are sewn and attached to the inside bent portions along the longitudinal direction thereof in a line alternate manner of skipping over one or more inside bent portions adjacent to each other.

9. The filter for a dust collector of claim 7, wherein the reinforced cloths are configured as a plurality of reinforcement pieces which are sewn and attached to the outer sides of the inside bent portions so as to be spaced apart from each other at regular intervals along the longitudinal direction thereof.

10. The filter for a dust collector of claim 1, further comprising outside bent portions, each of which is formed outside the filter cloth at a side opposite to the retainer and is defined by a sewing line.

11. A filter for a dust collector comprising:
    a filter cloth having a corrugated form, the filtered cloth having a plurality of outside bent portions and a plurality of inside bent portions;
    a retainer disposed inside the filter cloth;
    an inside support groove formed at each corrugated inside bent portion abutting the retainer in a longitudinal direction of a filter film;
    an inside reinforcement member inserted into the inside support groove;
    an outside support groove formed at each corrugated outside bent portion in the longitudinal direction of the filter film;
    an outside reinforcement member inserted into the outside support groove; and
    reinforced cloths disposed on outer surfaces of the filter cloth between the filter cloth and the retainer the reinforced cloths surrounding respective inside bent portions without reaching the respective outside bent portions.

12. The filter for a dust collector of claim 11, wherein each of the inside and outside support grooves is formed via a sewing process.

13. The filter for a dust collector of claim 11, wherein the inside and outside reinforcement members are fixedly attached within the inside and outside support grooves, respectively.

14. The filter for a dust collector of claim 11, wherein each of the inside and outside reinforcement members is provided in the form of a strap or a tape having at least larger strength than that of the basic material of the filter cloth.

15. The filter for a dust collector of claim 14, wherein the inside and outside reinforcement members are fixed to the inside and outside support grooves through sewing lines defined therein by sewing, respectively.

16. The filter for a dust collector of claim 11, wherein each of the inside and outside reinforcement members is made of a material equal to the basic material of the filter cloth.

17. The filter for a dust collector of claim 11, wherein the reinforced cloths are sewn and attached to outer sides of the inside bent portions.

18. The filter for a dust collector of claim 17, wherein the reinforced cloths are sewn and attached to the inside bent portions along the longitudinal direction thereof in a line alternate manner of skipping over one or more inside bent portions adjacent to each other.

19. The filter for a dust collector of claim 17, wherein the reinforced cloths are configured as a plurality of reinforcement pieces which are sewn and attached to the outer sides of the inside bent portions so as to be spaced apart from each other at regular intervals along the longitudinal direction thereof.

* * * * *